3,381,072
             BALE-FORMING MACHINE AND PROCESS
Clifford A. Mutton, Sarnia, Ontario, Canada, Paul H.
  Rossiter, Paoli, Pa., and Peter Thiessen and Wilfred
  James Weir, Sarnia, Ontario, Canada, assignors, by di-
  rect and mesne assignments, to Welding Engineers, Inc.,
  Norristown, Pa., a corporation of Delaware
              Filed Oct. 23, 1963, Ser. No. 318,403
                    7 Claims. (Cl. 264—148)

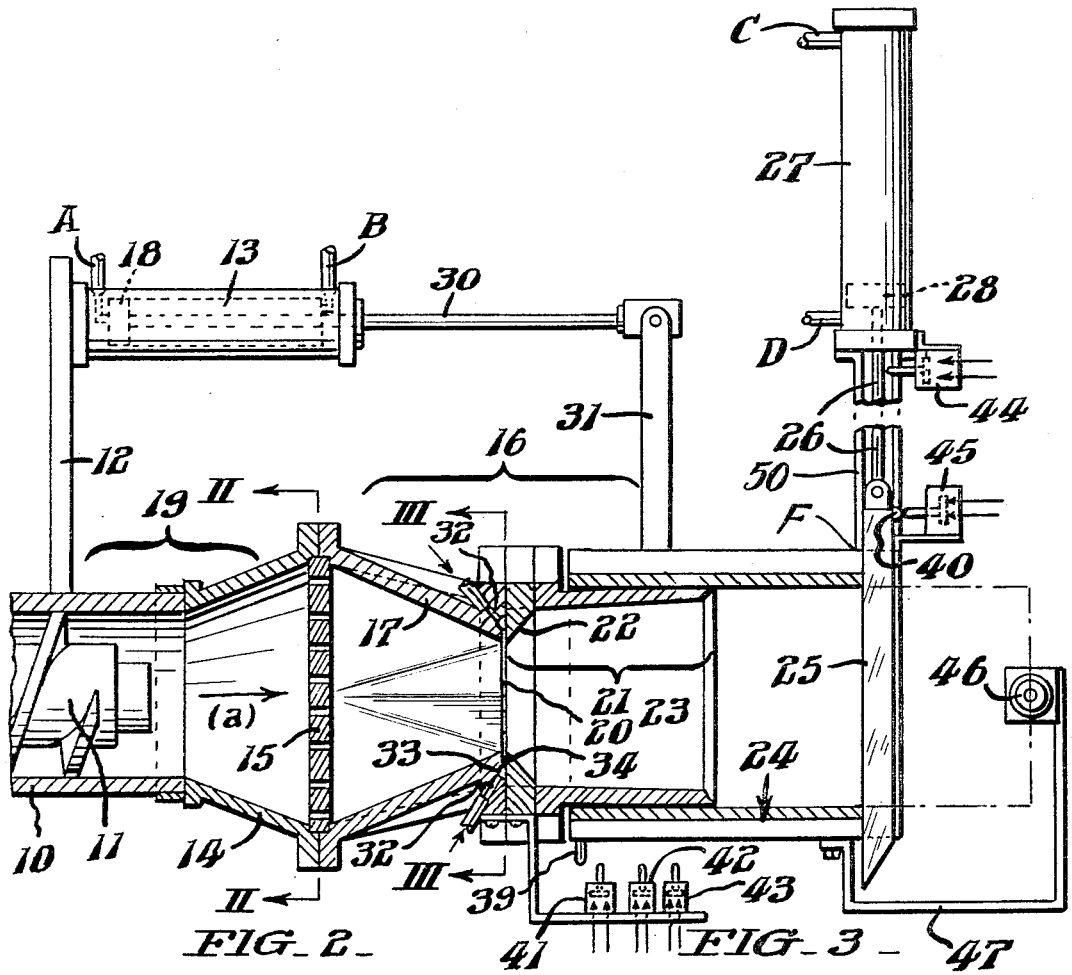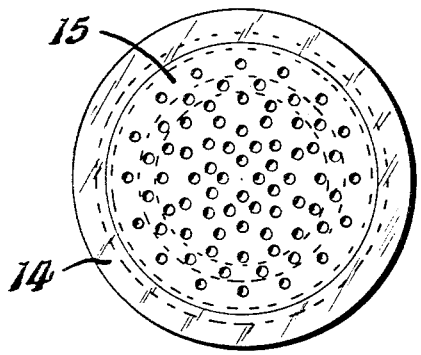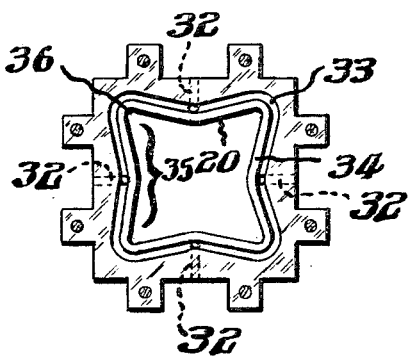

This invention relates to an apparatus and method for forming bales of a deformable material of any kind. Particular examples of deformable materials to which the present invention can advantageously be applied are elastomeric materials such as synthetic rubbers, for example, butyl rubber. More specifically, the invention is directed to an apparatus and method for forming a series of bales having accurately reproducible weight and size as well as satisfactory surface from such a deformable material.

The patent of Hall et al. No. 3,039,128, granted June 19, 1962, discloses a method and apparatus for forming solid extruded blocks from a deformable material. According to the method of Hall et al. the deformable material is passed through a die-plate, then through an expansion chamber which is internally roughened and then through a forming operation in a chamber which is internally lubricated but which does not completely confine the material since the downstream end of the chamber is open. Finally, the material is severed into the individual blocks or billets by means of a remotely positioned cutter.

While the apparatus and method disclosed in the Hall et al. patent can be operated to produce blocks as disclosed, several factors come into play during its operation to cause variations in the size and shape of the blocks produced therewith. It is accordingly an object of this invention to provide an apparatus and a method for producing a product in the form of bales which have a more uniform weight and size reproducibility and a better surface finish than the blocks produced with the apparatus of Hall et al.

As stated in the Hall et al. patent, when many materials, such as butyl rubber, are deformed and heated, they develop internal stresses which manifest themselves during and even after subsequent expansion and cooling. These internal stresses present a serious problem when it is desired to produce blocks. Due to relaxation of these internal stresses, the material tends to deform further and undergo surface tearing, even after the block has been carefully formed to accurate shape with accurate dimensions. Accordingly, it is another object of this invention to provide an apparatus and method for producing bales of deformable material in which method and apparatus such internal stresses are so introduced and then redistributed prior to the cutting of the bales that there is a minimum further deformation or surface tearing thereof after the cutting.

Other objects and advantages of this invention will further become apparent hereinafter and in the drawings of which:

FIG. 1 represents a view in side elevation showing a preferred form of bale-forming apparatus constructed in accordance with this invention;

FIG. 2 represents a sectional view taken as indicated by the lines and arrows II—II which appear in FIG. 1;

FIG. 3 represents a sectional view taken as indicated by the lines and arrows III—III which appear in FIG. 1.

Referring now to the specific form of the invention which is intended to produce bales having a square cross-section and which has been selected for illustration in the accompanying drawings, the number 19 comprehensively designates a feed means comprising an extruder 10 having a generally cylindrical housing and a worm 11 arranged to propel the deformable material continuously in a downstream direction, indicated by the arrow *a*. Located at the outlet end of the extruder 10 is an expansion cone 14, the cross-sectional area of which increases in a downstream direction. Fixed across the outlet end of expansion cone 14 and completing the feed means is a breaker plate 15 having a multiplicity of small openings shown in the drawings as circles but which can be of any desired shape. The breaker plate 15 serves to distribute the deformable material over the whole cross-sectional area of the input and of the next section. It should be noted that the expansion cone 14 simply serves in effect to increase the diameter of the outlet of the feed means 19. It is not an essential part of the apparatus and the same results could be obtained for instance, by using an extruder having a larger diameter outlet.

In accordance with this invention, there is provided, downstream of the feed means 19, a venturi structure comprehensively designated 16 which has a compression section 17 which decreases in cross-sectional area in a downstream direction and which also changes from a circular cross-section at its upstream end (at the breaker plate 15 of the feed means 19) to a "deformed square" cross-section at its downstream end. This "deformed square" cross-section which is shown in FIG. 3 forms a restricted throat 20. The cross-section of the downstream end of the compression section 17 may, however, be circular or polygonal if it is desired to produce bales having a different cross-sectional shape. In the case of a polygonal cross-section, each side of the polygon, for example side 35 in FIG. 3, will be "deformed" so that the centre of each side is displaced towards the centre of the polygon, generally in the form of an arc. In this case, the cusps 36, joining such "arcs" are advantageously reversely rounded, as is the case for the corners of the deformed square shown in FIG. 3.

Downstream of the compression section 17 is an expansion section 21 which, as shown, has a first section 22, the cross-sectional area of which increases rapidly in a downstream direction and a further section 23, the cross-sectional area of which increases more gradually in a downstream direction. The cross-sectional shape of section 22 of the expansion section 21 gradually changes from the "deformed square" shape at the restricted throat 20 to a square cross-section at the downstream end of the section 22. The section 23 has a square cross-section over its entire length, and the cross-sectional area of this section gradually increases in the downstream direction.

Located downstream of the venturi member 16 is a chamber 24 which is arranged to fit over the outside of section 23 of the expansion section 21. A small clearance is provided between the inside surface of chamber 24 and the outside of section 23 and chamber 24 is arranged to move backwards and forwards over section 23. The movable chamber 24 is connected through a connecting arm 31 and a rod 30 to the piston 18 of a hydraulic cylinder 13 which in turn is attached by a support arm 12 to the feed means cylinder housing 10.

The downstream end of chamber 24 is shown in FIG. 1 as being closed by a blade 25 which is connected to a rod 26 which in turn is linked to a piston 28 of a hydraulic cylinder 27. By means of this hydraulic system, the blade 25 may be retracted vertically to allow deformable material to be displaced from inside chamber 24.

The hydraulic cylinder 27 is mounted on a frame 50, which frame is positioned at the downstream end of the chamber 24, as at F (FIG. 1), so that the blade 25 which is slidably mounted in the frame 50 will move in unison with the chamber 24 (as will be more fully explained hereinafter).

Means are also provided for introducing a fluid lubricant into the restricted throat 20 in order to lubricate the surface of the deformable material as it passes into the expansion sections 22 and 23. As shown in FIGS. 1 and 3, passages 32 are provided for feeding the lubricant to a channel 33 (see also FIG. 3) which has a semi-circular cross-section and which extends completely around and outside of the periphery of the restricted throat 20 and which is in uniform fluid communication therewith, by way of a continuous opening 34 which also extends completely around the periphery of the restricted throat 20. In this way, the friction between the internal surface of compression section 17 and the deformable material therein is considerably greater than that between the deformable material and the internal surfaces of both the expansion section 21 and the chamber 24.

Means are provided for automatically actuating the apparatus just described and these means are shown schematically in FIG. 1. The reciprocating movement of the chamber 24 over the section 23 is controlled by the piston 18 in the hydraulic cylinder 13 which has hydraulic fluid lines A and B. Automatic limit switches 41, 42 and 43 are provided adjacent to the path of movement of a projection 39 carried by the chamber 24. The vertical movement of the blade 25 is controlled by the piston 28 in the hydraulic cylinder 27 which has hydraulic fluid lines C and D. Automatic limit switches 44 and 45 are provided adjacent to the path of movement of a projection 40 on the blade 25. A photoelectric control system comprising a photoelectric cell 46 and a light source (not shown) is provided on an arm 47 connected to the chamber 24 for the purpose of actuating downward movement of the blade 25 to cut off the deformable material displaced from the chamber 24. The functions of this photoelectric control system and of the aforementioned limit switches will be more readily understood from the following description of the operation of the apparatus according to this invention.

The apparatus according to the invention operates in a continuous manner and the sequence of steps in a single cycle of operation will now be described. For convenience, a cycle will be considered to begin with the component parts of the apparatus in the positions indicated in FIG. 1, namely with the chamber 24 in its fully retracted upstream position and with blade 25 in its lowest position closing the downstream end of chamber 24. As the deformable material which fills the apparatus is moved forward by worm 11, the pressure of the deformable material on the inner surface of blade 25 increases. This pressure is transmitted through arm 31 and rod 30 to the piston 18 in the hydraulic cylinder 13 and causes the hydraulic fluid to flow out of cylinder 13 through line B. This flow is controlled by a back-pressure maintained by a conventional pressure control valve (not shown) in the hydraulic system which ensures that the total counter force exerted by the blade 25 and the frictional forces on the deformable material in chamber 24 remains at a constant predetermined value, as the chamber 24 moves in a downstream direction. As the deformable material passes through the restricted throat 20, lubricant is applied to the surface thereof through opening 34 and the friction between the surface of the deformable material and the inner surfaces of sections 22 and 23 and of chamber 24 is thereby lessened, the lubricant flowing into opening from channel 33 into which it is fed by passages 32.

The chamber 24 then continues to move in a downstream direction and the contact 39 attached thereto passes limit switch 41 but cannot actuate this switch since switch 44 is open and the control circuits are arranged so that switch 41 can only be actuated when switch 44 is closed. As the downstream movement of chamber 24 continues, the contact 39 reaches and closes limit switch 42 thus actuating a solenoid valve (not shown) which causes the aforementioned control valve connected to line B of cylinder 13 to be by-passed thereby allowing the hydraulic fluid to flow freely through line B from cylinder 13. As a result, the chamber 24 is caused to move rapidly in a downstream direction by the pressure which is being exerted by the deformable material on the inside face of blade 25, this rapid downstream movement allowing a partial but significant release of the internal compression stresses in the deformable material.

Due to the nature of the stress distribution in the deformed material in chamber 24, the material not only expands in a downstream direction but also contracts slightly in its cross-sectional area, the cross-sectional shape of the expanded material, however, conforming very closely to the cross-sectional shape of chamber 24. The separation of the material from the inside vertical and upper surfaces of chamber 24 is of importance and this is one reason why adequate lubrication in this section is essential.

This forward movement of chamber 24 continues but decelerates until this movement is solely due to the pressure resulting from the material being fed by feed means 19 with no back-pressure being applied against piston 18. This forward movement of chamber 24 continues until contact 39 reaches and closes limit switch 43 thereby actuating a second solenoid valve (not shown) which causes hydraulic fluid to be fed under pressure into line B of cylinder 27 thereby raising the blade 25.

When blade 25 reaches its upper position, contact 40 actuates upper limit switch 44 which in turn actuates a solenoid valve (not shown) to apply hydraulic fluid under pressure to line B of cylinder 13. The pressure of this hydraulic fluid is applied against piston 18 and the resulting force is transmitted to chamber 24 which consequently moves in an upstream direction; contact 39 then leaves limit switch 43 and passes limit switch 42. Limit switch 42 is not, however, actuated since switch 45 is open and the control circuits are so arranged that limit switch 42 can only be actuated when limit switch 45 is closed. As the movement of chamber 24 in an upstream direction continues, contact 39 reaches and actuates limit switch 41 which can be actuated since limit switch 44 is closed. Actuation of limit switch 41 energizes a further solenoid valve (not shown) to adjust the pressure on piston 18 of cylinder 13 so that movement of chamber 24 is stopped.

The deformable material continues to pass out of chamber 24 due to the fact that it is being continuously fed by feed means 19 and to the fact that further relaxation of the stresses in the material is taking place. When the downstream end of the deformable material intercepts the beam of light from the light source (not shown) falling on the photoelectric cell 46, a solenoid valve (not shown) is actuated and causes hydraulic fluid to be applied under pressure to line C of cylinder 27 thereby causing blade 25 to descend and cut the deformable material across the outlet end of chamber 24. When the blade 25 reaches its lowest position, contact 40 closes limit switch 45 which actuates a solenoid valve (not shown) to apply hydraulic fluid under pressure to line B of cylinder 13 until the pressure at line B reaches a predetermined value. Chamber 24, therefore, moves in an upstream direction until the force transmitted to piston 18 due to the total pressure of the deformable material on blade 25 and chamber 24 is balanced by the predetermined force applied hydraulically against piston 18. During this latter step, the severed bale is removed by any convenient means and the apparatus then commences the next cycle.

It will be appreciated that the relative dimensions of the apparatus and the conditions under which it is operated will vary when different deformable materials are handled or when bales of a different size or shape are to be formed. Whilst the restricted throat 20 has been shown as having a "deformed square" cross-section and the chamber 24 has been shown as having a square cross-section; these sections, as previously explained, may be circular if it is desired to produce bales having a circular cross-section or the restricted throat may have a "deformed" polygonal cross-section and the chamber 24 may then have a corresponding "non-deformed" polygonal cross-section to produce bales having such a polygonal cross-section.

The basic principle underlying the operation of the apparatus according to the invention involves the formation under pressure of the deformable material in the deforming chamber in such a way that the resulting stresses are so distributed that, as the resulting highly compacted mass of material passes through the expansion section of the deforming chamber and into the second chamber, these stresses are substantially relieved and the material tends strongly to adopt the desired final cross-sectional shape. One purpose of the second chamber is to assist further the adoption by the deformable material of the desired cross-sectional shape. This is effected by completely confining the material under pressure in the second chamber at the desired cross-sectional shape so that any stresses remaining in the material are further relieved in the expansion section of the deforming chamber and in the second chamber in such a way that any additional stresses introduced into the material serve to cause the material to adopt permanently the desired cross-sectional shape. For instance, when the material has been forced through the restricted throat 20, the internal stresses are so distributed that the material strongly ends then to adopt the cross-sectional shape of the chamber 24. Due to the pressure applied to the material in the chamber 24, the material is forced to fill both the expansion section of the deforming chamber and the chamber 24 so that, when the chamber 24 is allowed to move freely in a downstream direction or when the blade is removed, the compressive stresses in the material are substantially completely released and the material expands in a longitudinal direction and contracts slightly in cross-sectional size, retaining, however, substantially the same cross-sectional shape. The material is then cut. After the cutting of the bale, there will generally be slight further relaxation of the compressive stresses in the material with consequent slight further increase in the length of the bale with only slight further reduction in the cross-sectional area but again with substantially no alteration in its cross-sectional shape.

A further purpose of the second chamber is to ensure adequate lubrication between the deformable material and the inside surface of the compression section of the deforming chamber and between the deformable material and the inside surface of the second chamber, which lubrication will ensure that the material will separate from these surfaces for displacement from the apparatus without any additional stresses, particularly surface stresses, being introduced into the material.

As a result of maintaining the material under pressure in the apparatus by means of the second chamber, the resulting bales have improved uniformity and reproducibility of weight and dimensions and consequently of density.

It will also be understood that the extent of the deformation applied to the material in the deformation chamber will depend on the rheological properties of the deformation material.

As previously stated, particularly satisfactory results have been obtained using the apparatus essentially as shown in the drawings for forming bales of butyl rubber. In the tests which were made, the diameter of the outlet of feed means 19 (at the breaker plate 15) was 11 inches. In the compression section, which had a length of about 9 inches, the rubber was compressed to pass through a restricted throat 20 having the form shown in FIG. 3, a maximum height of about 8⅛ inches and a minimum height of about 6 inches. Section 22 of the expansion section 21 had a length in the direction of flow of about 2 inches and section 23 had a length of about 18 inches. Chamber 24 had internal diameter of about 10¼ inches and moved over a longitudinal distance of about 8 inches.

When operated with a butyl rubber having a Mooney viscosity of 75, measured for 8 minutes at 212° F., and a molar unsaturation of about 1.5%, the rubber being fed to the extruder at a temperature of about 80° F., the hydraulic control system was adjusted so that a total restraining force of 20,000 lbs. was applied to the material when the blade 25 was in its lowest position. In the test with butyl rubber, the chamber 24 was not moved freely in a downstream direction immediately before the blade was raised but, after the blade was raised, the chamber 24 was retracted about 4 inches. The arm 47 had such a length that the photoelectric control system actuated downward movement of blade 25 when the bale was about 13 inches long. Immediately after cutting, the bales were measured and then re-measured after intervals of time to determine the extent of the relaxation. The following results were obtained:

|  | Bale dimensions (inches) | |
| --- | --- | --- |
|  | Length | Cross-section |
| Time after cutting: |  |  |
| 0 | 13 | 10 x 10 |
| 40 sec. | 16¼ | 9¼ x 9¼ |
| 1 min. | 16⅝ |  |
| 2 min. | 17 | 9 x 9 |
| 3 min. | 17½ |  |
| 5 min. | 17⅞ |  |
| 10 min. | 18¼ | 8¾ x 8¾ |

From these results, it will be seen that most of the relaxation occurred in the first minute after cutting. In this test, the apparatus gave excellent reproducibility as concerns the weight of the bales and their cross-sectional dimensions as well as giving smooth bales surface. The weights of sixteen consecutively formed bales were as follows: 41¾, 41¾, 41½, 41½, 41¾, 41¾, 41⅜, 41¾, 41¾, 41¾, 41¾, 41¾, 41¾, 41½, 41½ and 41½ lbs.

In the case of butyl rubber, it is prefered to use a liquid lubricant at the restricted throat 20 and, for this purpose, silicone emulsions and detergent solutions have proved successful. With some deformable materials, however, the friction thereof with the internal surfaces downsteam of the restricted throat may be reduced by lining or constructing these surfaces of "low friction" materials such as polytetrafluoroethylene.

Although the invention has been described with reference to a specific form thereof, it will be appreciated that other variations may be made without departing from the spirit and scope of the invention.

In particular, it should be noted that the removal of the back-pressure at cylinder 13 to allow rapid downstream movement of chamber 24 immediately prior to the retraction of blade 25 may not be necessary, as in the case of the above-mentioned test with butyl rubber, but this downstream movement has the important advantage that it reduces the hydraulic force necessary to retract the blade due to the reduction of the forces, principally the frictional resistance, applied thereto by the material in chamber 24.

Although the chamber 24 has been described using the blade 25 as the closing means therefor, modifications may be made so that the means for closing chamber 24 and the means for cutting the material periodically displaced from this chamber are separate.

Furthermore, additional limit switches and other control means may be incorporated in the apparatus to ensure fully automatic operation and to render the apparatus non-operative in the event of a malfunction.

The following is claimed:

1. In an apparatus for forming bales of a deformable material wherein a feed means is provided for advancing said material under pressure along a predetermined path, said feed means having an outlet through which the material is ejected, the combination which comprises: means providing a deforming chamber arranged in fixed position downstream of and in pressure communication with said feed means outlet, said deforming chamber having a compression section of cross-sectional area reducing in a downstream direction and terminating in a restricted throat, and having an expansion section expanding in a downstream direction from said throat, means forming a second chamber located downstream of said deforming chamber, and adapted to slide axially back and forth over a portion of the length of the downstream end of the expansion section, cutting means disposed across the downstream end of said second chamber, and arranged to confine completely the material in said second chamber, said cutting means being adapted to move in unison with said second chamber and automatic means for periodically retracting said cutting means to allow periodic displacement of said material from said second chamber, means for retracting said second chamber in an upstream direction after retraction of said cutting means and means responsive to said displacement for actuating said cutting means to cut said displaced material.

2. The apparatus defined in claim 1 wherein means are provided, automatically responsive to the closing movement of said cutting means, for further retracting said second chamber in an upstream direction.

3. The apparatus defined in claim 1 wherein means are provided for automatically moving said second chamber in a downstream direction just before said automatic means is effective to retract said cutting means.

4. In a method for forming bales of a deformable material, the steps which comprise advancing said material under pressure along a predetermined path, from the outlet of a feed means to a deforming chamber arranged in fixed position downstream of and in pressure communication with said feed means outlet, compressing said deformable material in a first section of said deforming chamber which section has a cross-sectional area reducing in a downstream direction and which terminates in a restricted throat, forcing said material through said throat and allowing said material to expand in an expansion section of said deforming chamber which section expands in a downstream direction from said throat, allowing said material to pass from said deforming chamber into a second chamber, located downstream of said deforming chamber, and adapted to slide axially back and forth over a portion of the length of the downstream end of the expansion section, and in which said material is completely confined by a cutting means disposed across the downstream end of said second chamber, said cutting means being adapted to move in unison with said second chamber, periodically retracting said cutting means to allow periodic displacement of said material from said chamber, then retracting said second chamber in an upstream direction to displace further said material from said chamber, and then actuating said cutting means to cut off said displaced material.

5. The method defined in claim 4 including the step of further retracting said second chamber in an upstream chamber after the closing of the downstream end of said second chamber by said cutting means.

6. The method defined in claim 4 including the step of automatically moving said second chamber in a downstream direction just before automatically retracting said cutting means.

7. The method defined in claim 4 wherein the deformable material is butyl rubber.

References Cited
UNITED STATES PATENTS

| | | | |
|---|---|---|---|
| 824,008 | 6/1906 | Gowdy | 107—69 |
| 1,858,956 | 5/1932 | Hepperle | 25—14 |
| 2,649,618 | 8/1953 | Rhodes et al. | 18—12 |
| 3,039,138 | 6/1962 | Hall et al. | 25—10 |

ROBERT F. WHITE, *Primary Examiner.*

S. I. LANDSMAN, *Assistant Examiner.*